Patented Jan. 27, 1925.

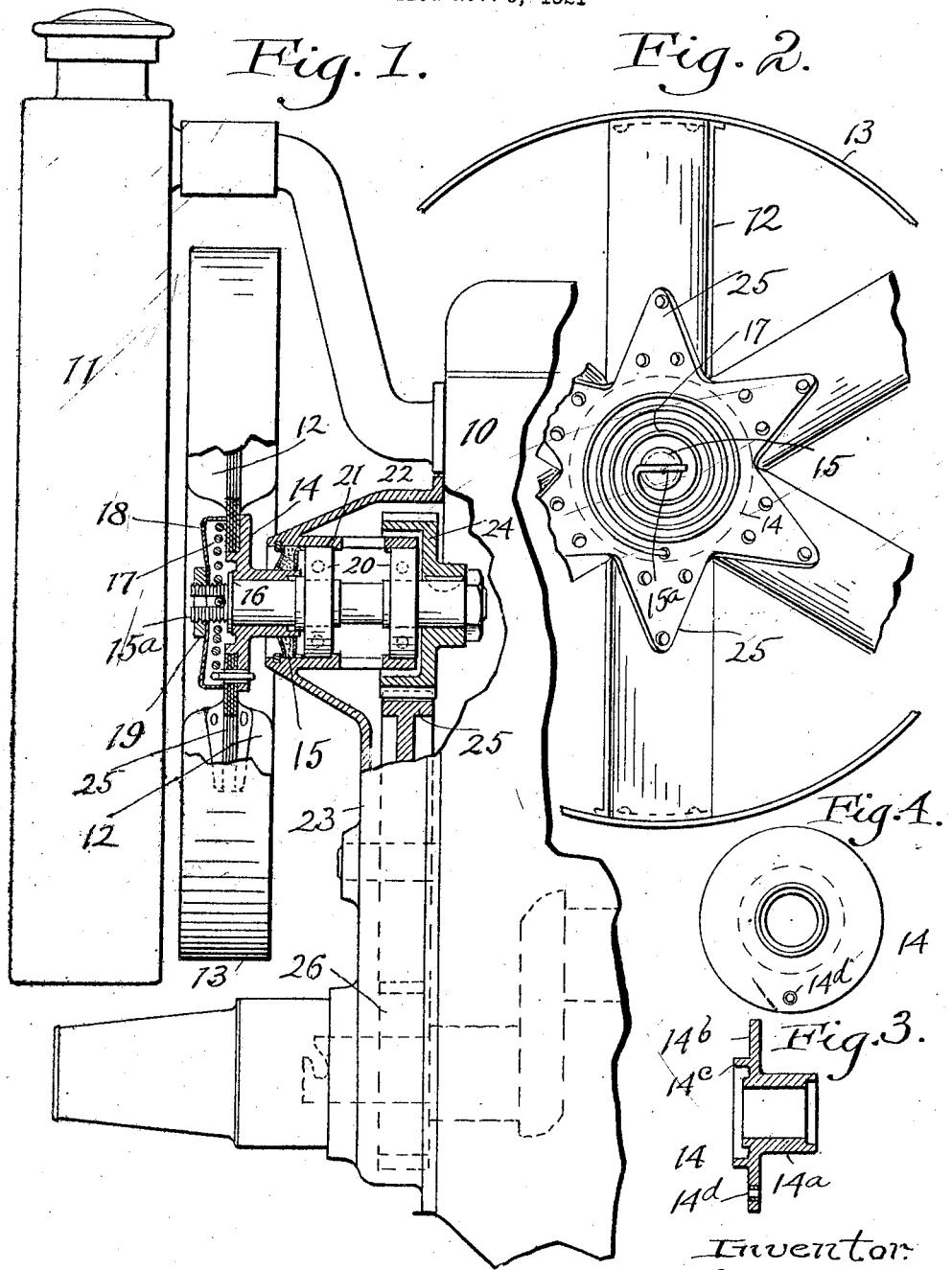

1,524,028

UNITED STATES PATENT OFFICE.

GILBERT C. GOODE, OF CLEVELAND, OHIO, ASSIGNOR TO THE WHITE MOTOR COMPANY, OF CLEVELAND, OHIO, A CORPORATION OF OHIO.

FAN MOUNTING FOR INTERNAL-COMBUSTION ENGINES.

Application filed November 9, 1921. Serial No. 513,925.

*To all whom it may concern:*

Be it known that I, GILBERT C. GOODE, a citizen of the United States, residing at Cleveland, in the county of Cuyahoga and State of Ohio, have invented a certain new and useful Improvement in Fan Mountings for Internal-Combustion Engines, of which the following is a full, clear, and exact description.

The present invention relates to a fan mounting for use with cooling fans for internal combustion motors whereby the fan is flexibly driven by the fan shaft.

Reference should be had to the accompanying drawings forming a part of this specification in which Fig. 1 is an elevation with portions in section showing a fan for an internal combustion engine and its mounting; Fig. 2 is a front elevation of the fan; Fig. 3 is a vertical section showing the fan hub; Fig. 4 is a front elevation of the fan hub.

Referring to the drawings, 10 indicates the engine proper and 11 indicates the radiator. Behind the radiator it is customary to mount the engine fan and in the present instance this custom is followed.

The fan itself comprises a series of spokes 12 which are arranged in an angular position as is customary in the arrangement of fan blades. These blades at their outer end are secured to the rim 13 and the blades at their inner end are secured to the hub which is generally indicated at 14 and are held to the hub by means of an outside plate which is represented at 25.

The hub of the fan comprises a sleeve portion $14^a$ and a flange portion $14^b$, the flange has an offset collar $14^c$ and the blades of the fan are secured to the hub along the flange $14^b$. The driving shaft for the fan is shown at 15 and upon this shaft the hub 14 is mounted, this hub being unattached or connected with the shaft so that it may rotate relative thereto. The end of the shaft has a threaded neck and on this threaded neck there is a retention member 16 which engages with the hub and holds it in position from moving outwardly.

Surrounding the end of the shaft 15 is a spirally coiled spring which is indicated at 17. This spring at one of its ends, as for instance the inner end, is connected with the shaft and this provision is conveniently carried out by slotting the end of the shaft as indicated at $15^a$ and passing one end of the spring into this slot. The opposite end of the spring 17 is passed through a hole $14^d$ which is formed in a portion of the flange $14^b$. It will thus be seen that opposite ends of the spring 17 are connected respectively with the shaft 15 and with the fan hub.

Rotation of the shaft 15 causes the spring 17 to wind up or to coil closer around the shaft 15 and in doing this, motion is transmitted from the shaft 15 to the hub of the fan.

At the end of the shaft 15 there is a cover 18 which merely covers up the spring 17 so as to keep dirt away from it and this cover is held on the end of the shaft 15 by means of a nut 19.

The fan shaft is mounted in suitable ball bearings which are indicated at 20, these being carried by a reentrant flange 21 within a housing 22, this housing forming part of a gear casing 23 which is carried at the end of the engine.

The shaft 15 is at its end provided with a gear 24 which is in turn driven by an idler 25 which in turn meshes with a gear 26 driven from a rotating part of the engine.

Obviously it is immaterial whether the fan shaft be driven by gearing or by some form of belt or chain drive as the same general result will be accomplished in either event.

Having described my invention, I claim:

1. A fan mounting comprising a fan having an attached hub, a fan shaft having an end portion upon which said fan is mounted, the outer end of said shaft projecting beyond the outer end of the hub and having a transverse slot extending inwardly from its outer end, a spiral spring on the outer side of the fan, said spring having its inner end in said notch in the shaft and its outer end secured to the fan, a casing secured upon the outer face of the fan and enclosing said spring, said casing having an opening to receive the end of the shaft, means carried by the shaft for retaining the fan thereon, and means carried by the shaft for holding the casing in place.

2. A fan mounting comprising a fan having an attached hub, a fan shaft having an end portion upon which the fan is mounted, the outer end portion of the fan being screw threaded and projecting beyond the outer end of the hub, said threaded portion of the shaft having a transverse slot extending inwardly from its outer end, means carried by said threaded portion of the shaft for retaining the hub on the shaft, a spiral spring on the outer side of the fan, said fan having its outer end secured to the fan and its inner end disposed in the slot in the shaft, a cup-shaped casing upon the outer side of the fan, said casing having an inwardly extending flange surrounding the spring and engaging the outer face of the fan, said casing having a central opening through which the threaded end of the shaft extends, and a nut on the threaded end of the shaft for securing said casing in place.

In testimony whereof, I hereunto affix my signature.

GILBERT C. GOODE.